(12) United States Patent
Chen

(10) Patent No.: US 7,414,330 B2
(45) Date of Patent: Aug. 19, 2008

(54) POWER SWITCH DEVICE

(75) Inventor: Tian-Hau Chen, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 317 days.

(21) Appl. No.: 11/405,382

(22) Filed: Apr. 17, 2006

(65) Prior Publication Data

US 2007/0205668 A1    Sep. 6, 2007

(30) Foreign Application Priority Data

Mar. 2, 2006    (TW) .............................. 95106967 A

(51) Int. Cl.
*H02J 1/00*    (2006.01)
*H02J 1/10*    (2006.01)
*H02J 3/00*    (2006.01)

(52) U.S. Cl. .............................. 307/43; 307/64; 307/85; 307/112

(58) Field of Classification Search .................. 307/43, 307/64, 85, 112
See application file for complete search history.

(56) References Cited

U.S. PATENT DOCUMENTS

| 5,187,396 A | * | 2/1993 | Armstrong et al. | ............. 327/65 |
| RE36,179 E | * | 4/1999 | Shimoda | ...................... 327/407 |
| 6,853,098 B1 | * | 2/2005 | Jackson et al. | ................. 307/85 |
| 7,176,728 B2 | * | 2/2007 | Kushnarenko | ............... 327/108 |
| 2003/0169024 A1 | * | 9/2003 | Cook | ......................... 323/268 |

* cited by examiner

*Primary Examiner*—Michael J Sherry
*Assistant Examiner*—Adi Amrany
(74) *Attorney, Agent, or Firm*—J.C. Patents

(57) ABSTRACT

A power switching device which is used to receive plenty of input voltage and output a switch voltage is provided. The device comprises a first switching unit, a second switching unit, and a self-bias unit. The power switching device outputs a switch voltage according to the outputs of the first switching unit and the second switching unit. The self-bias unit outputs a reference voltage to the second switching unit. The first switching unit outputs a first input voltage as the switch voltage according to a first enable signal. The second switching unit outputs a second input voltage as the switch voltage according to the reference voltage and a second enable signal.

19 Claims, 5 Drawing Sheets

POWER SWITCH DEVICE

CROSS-REFERENCE TO RELATED APPLICATION

This application claims the priority benefit of Taiwan application serial no. 95106967, filed on Mar. 2, 2006. All disclosure of the Taiwan application is incorporated herein by reference.

BACKGROUND OF THE INVENTION

1. Field of Invention

The present invention relates to a power switch device. More particularly, the present invention relates to a power switch device with a self-biasing circuit.

2. Description of Related Art

With the high demand on portable electronic devices, power management is an important issue for maintaining operation time. Generally, the portable electronic device integrates a lot of components and those components may be powered by different power sources.

FIG. 1 shows a conventional power switch device including switches S11 and S12. First terminals of the switches S11 and S12 receive input voltages Vin11 and Vin12 respectively. Second terminals of the switches S11 and S12 are coupled together for outputting a power source Vpp1. Two non-overlapping enable signals SEN11 and SEN12 are used for controlling the voltage switch. The switch S11 is turned on under control of the enable signal SEN11 while at the same time the switch S12 is turned off under control of the enable signal SEN12; and the switch S11 is turned off under control of the enable signal SEN11 while at the same time the switch S12 is turned on under control of the enable signal SEN12. When the switch S11 is turned on and the switch S12 is turned off, the power source Vpp1 takes in the input voltage Vin 11. Similarly, when the switch S12 is turned on and the switch S11 is turned off, the power source Vpp1 takes in the input voltage Vin12. The power source Vpp1 is switched as either of the input voltages Vin11 and Vin12. Therefore, under control of the enable signal SEN11 and SEN12, the conventional power switch device supplies the power source Vpp1 with different voltage values.

However, if the power source Vpp1 is used in a high voltage application, the power switch device has to be manufactured by high voltage manufacturing process. For example, if the power source Vpp1 is switched as either one of 1.8V and 7V, a high voltage manufacturing process suitable for 7V power source is applied to make the power switch device. But the resultant power switch device by high voltage manufacturing process has large circuit size and severe power consumption.

SUMMARY OF THE INVENTION

One of the aspects of the invention is to provide a power switch device for supplying a power source taking in high and low input voltages and the power switch may be made by a low voltage manufacturing process.

Another aspect of the invention is to provide a power switch device for supplying a power source taking in high and low input voltages and the power switch may have compact circuit size and low power consumption.

For the above and other aspects, the invention provides a power switch device, including a first switch circuit, a self-biasing circuit and a second switch circuit. The power switch device generates an output voltage based on outputs of the first and the second switch circuits. When the first switch circuit outputs the output voltage, the first switch circuit takes the first input voltage as the output voltage under control of a first enable signal. When the second switch circuit outputs the output voltage, the second switch circuit takes the second input voltage as the output voltage under control of a second enable signal.

The self-biasing circuit includes two resistors and two switches, wherein the switches both include a single N-type MOSFET. When the first and the second enable signals control conduction states of the first and the second switch circuits, the first enable signal also controls the switch inside the self-biasing circuit, so that a reference voltage generated from the self-biasing circuit makes a switch, receiving the reference voltage, inside the second switch circuit turned on.

In the invention, the power switch device is manufactured by low voltage manufacturing process. Therefore, the power switch device has small circuit layout and low power consumption.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
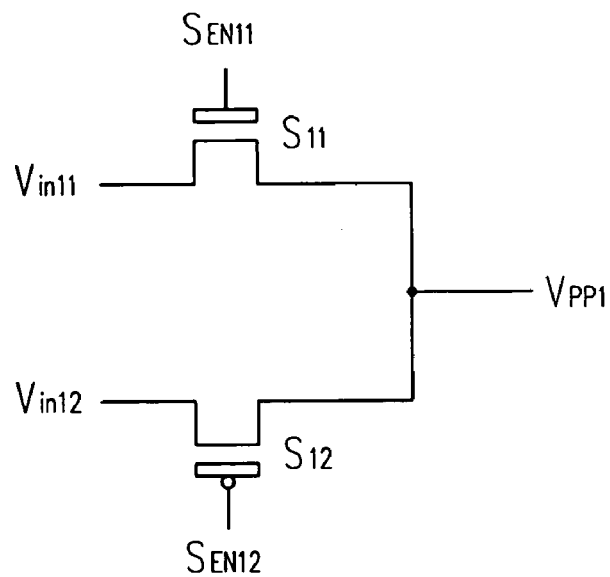
FIG. 1 shows a conventional power switch device.

Reference will now be made in detail to the present preferred embodiments of the invention, examples of which are illustrated in the accompanying drawings. Wherever possible, the same reference numbers are used in the drawings and the description to refer to the same or like parts.

Figure 2:
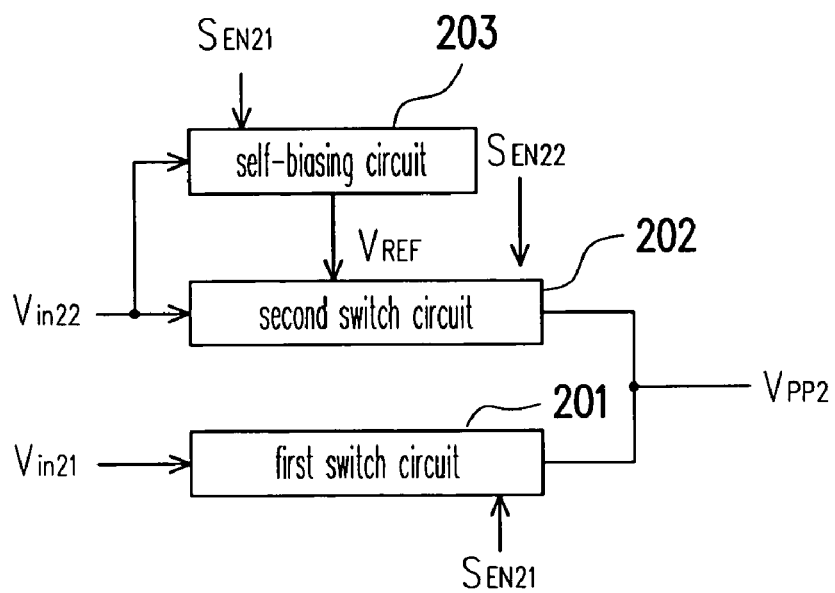
FIG. 2 shows a power switch device according to an embodiment of the present invention.

FIG. 2 shows a power switch device according to an embodiment of the present invention. As shown in FIG. 2, the power switch device includes a first switch circuit 201, a second switch circuit 202 and a self-biasing circuit 203. The first switch circuit 201 and the second switch circuit 202 respectively receive input voltages Vin21 and Vin22. Output terminals of the first switch circuit 201 and the second switch circuit 202 are coupled to each other. The self-biasing circuit 203 is coupled to the second switch circuit 202 for supplying a reference voltage VREF to the second switch circuit 202. An enable signal SEN21 is used for controlling the first switch circuit 201 and the self-biasing circuit 203. The second switch circuit 202 is controlled according to another enable signal SEN22 and the reference voltage VREF. The enable signals SEN21 and SEN22 are non-overlapping or reversed with each other. An output voltage Vpp2 is generated based on outputs of the first switch circuit 201 and the second switch circuit 202.

Figure 3:
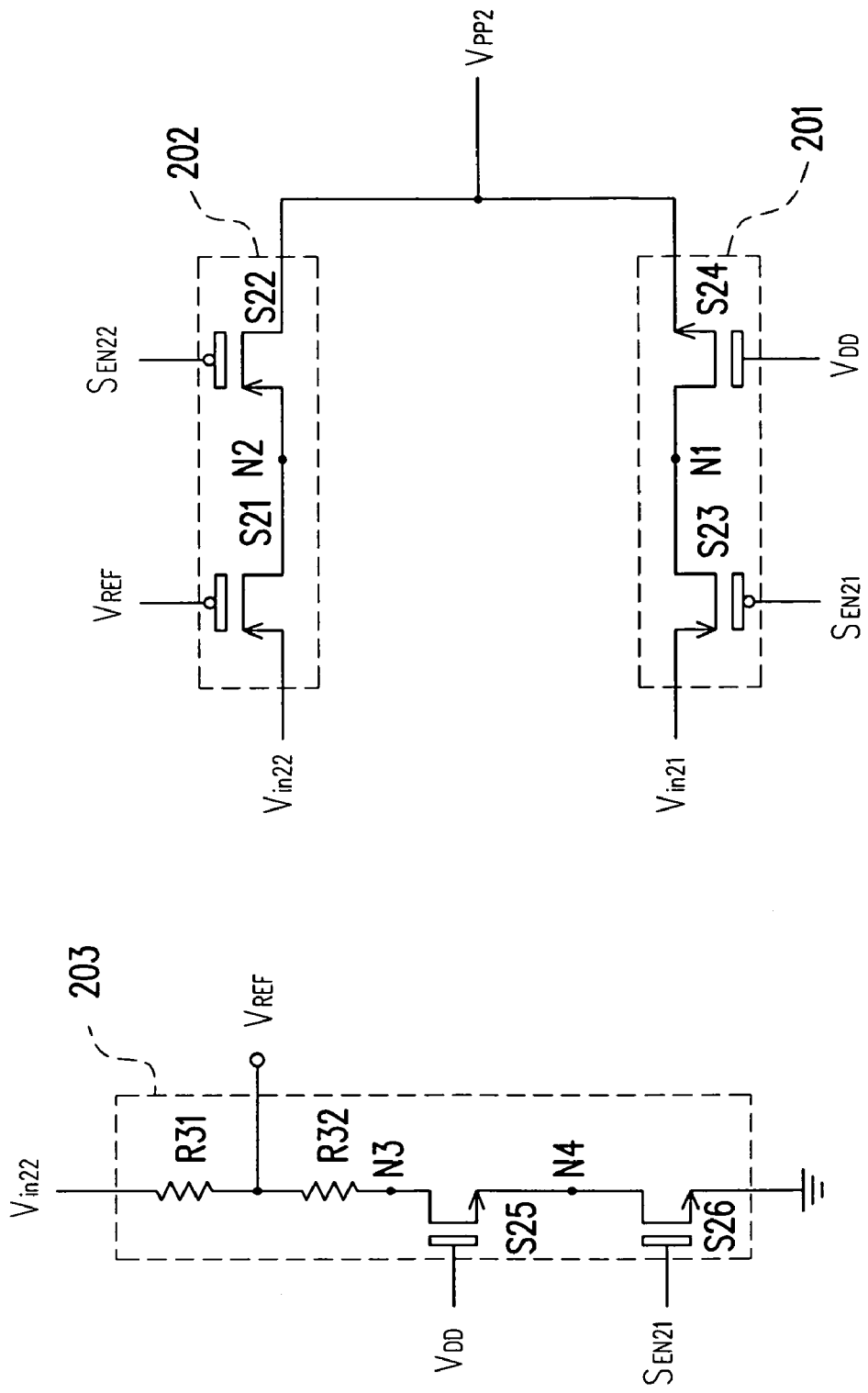
FIG. 3 shows details of the power switch device according to the embodiment of the present invention.

FIG. 3 shows details of the power switch device according to the embodiment of the present invention. As shown in FIG. 3, the first switch circuit 201 includes switches S23 and S24. The second switch circuit 202 includes switches S21 and S22. The self-biasing circuit 203 includes resistors R31 and R32 and switches S25 and S26. Each of the switches S21, S22 and S23 includes a single P-type MOSFET and each of the switches S24, S25 and S26 includes a single N-type MOSFET.

The switch S21 includes: a first terminal (source terminal) coupled to the input voltage Vin22, a second terminal (drain terminal) coupled to a first terminal of the switch S22 and a third terminal (gate terminal) coupled to the reference voltage VREF. Conduction state of the switch S21 is under control of the reference voltage VREF. The switch S22 includes: the first terminal (source terminal) coupled to the second terminal of the switch S21, a second terminal (drain terminal) coupled to a second terminal of the switch S24 for outputting the output voltage Vpp2 and a third terminal (gate terminal) coupled to the enable signal SEN22. Conduction state of the switch S22 is under control of the enable signal SEN22. The switch S23 includes: the first terminal (source terminal) coupled to the input voltage Vin21, a second terminal (drain terminal) coupled to a first terminal of the switch S24 for outputting the output voltage Vpp2 and a third terminal (gate terminal) coupled to the enable signal SEN21. Conduction state of the switch S23 is under control of the enable signal SEN21. The switch S24 includes: the first terminal (drain terminal) coupled to the second terminal of the switch S23, the second terminal (source terminal) coupled to the second terminal of the switch S22 for outputting the output voltage Vpp2 and a third terminal (gate terminal) coupled to the operation voltage VDD. Conduction state of the switch S24 is under control of the operation voltage VDD. The switch S25 includes: a first terminal (drain terminal) coupled to a second terminal of the resistor R32, a second terminal (source terminal) coupled to a first terminal of the switch S26 and a third terminal (gate terminal) coupled to the operation voltage VDD. Conduction state of the switch S25 is under control of the operation voltage VDD. The switch S26 includes: the first terminal (drain terminal) coupled to the second terminal of the switch S25, a second terminal (source terminal) being grounded and a third terminal (gate terminal) coupled to the enable signal SEN21. Conduction state of the switch S26 is under control of the enable signal SEN21.

The resistor R31 includes a first terminal coupled to the input voltage Vin22 and a second terminal coupled to a first terminal of the resistor R32 for outputting the reference voltage VREF. The resistor R32 includes a first terminal coupled to the second terminal of the resistor R31 for outputting the reference voltage VREF and the second terminal coupled to the first terminal of the switch S25.

The connection node between the switches S23 and S24 is referred as a node N1. The connection node between the switches S21 and S22 is referred as a node N2. The connection node between the switch S25 and the resistor R23 is referred as a node N3. The connection node between the switches S25 and S26 is referred as a node N4.

Figure 4:
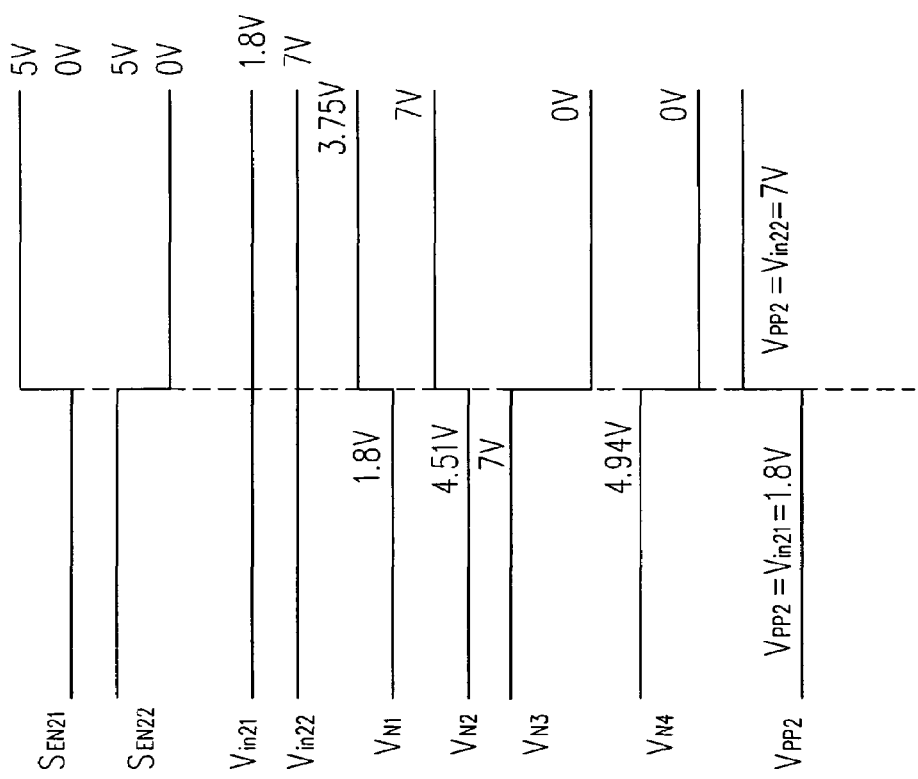
FIG. 4 shows a signal timing diagram for the power switch device according to the embodiment of the present invention.
Figure 5:
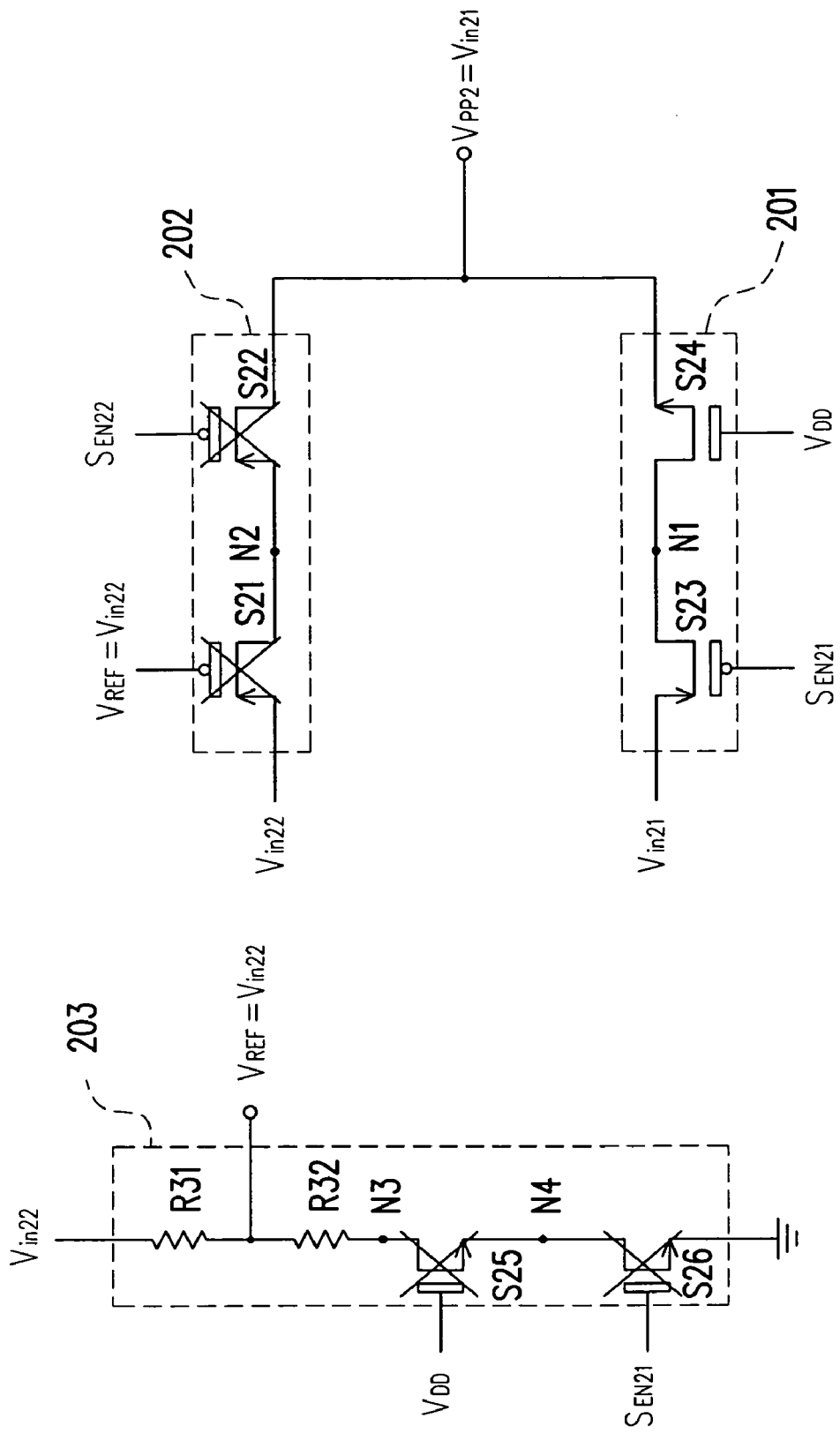
FIGS. 5 and 6 show operations of the power switch device under different modes.

FIG. 4 shows a signal timing diagram for the power switch device according to the embodiment of the present invention. Here, the operation voltage VDD, the input voltages Vin21 and Vin22 are 5V, 1.8V and 7V, respectively. FIG. 5 shows operations of the power switch device when the enable signal SEN21 and SEN22 are logic low (0V) and logic high (5V) respectively. Because the gate voltages of the switches S25 and S26 are VDD (5V) and logic low (0V) respectively, from the showing of the node voltages VN3 and VN4, the gate-to-source voltages ($V_{GS}$) of the switches S25 and S26 are lower than the threshold voltage, so the switches S25 and S26 are both turned off. Because of turn off of the switches S25 and S26, no current is flowed in the self-biasing circuit 203 and the reference voltage VREF is equal to the input voltage Vin22 (7V). Because the reference voltage VREF and the enable signal SEN22 are 7V and logic high (5V) respectively, the switches S21 and S22 of the second switch circuit 202 are turned off and the output voltage Vpp2 is based on the output voltage from the first switch circuit 201. In the first switch circuit 201, the logic low (0V) enable signal SEN21 is coupled to the gate terminal of the switch S23 (a P-type MOSFET) and the logic high (5V) VDD is coupled to the gate terminal of the switch S24 (an N-type MOSFET), so the switches S23 and S24 are both turned on. The output voltage from the first switch circuit 201 is equal to Vin21 (1.8V), which means the output voltage Vpp2 is also 1.8V. In this case, the conduction states of the switches S21~S24 is also known from the node voltage VN1 and VN2 in FIG. 4.

Figure 6:
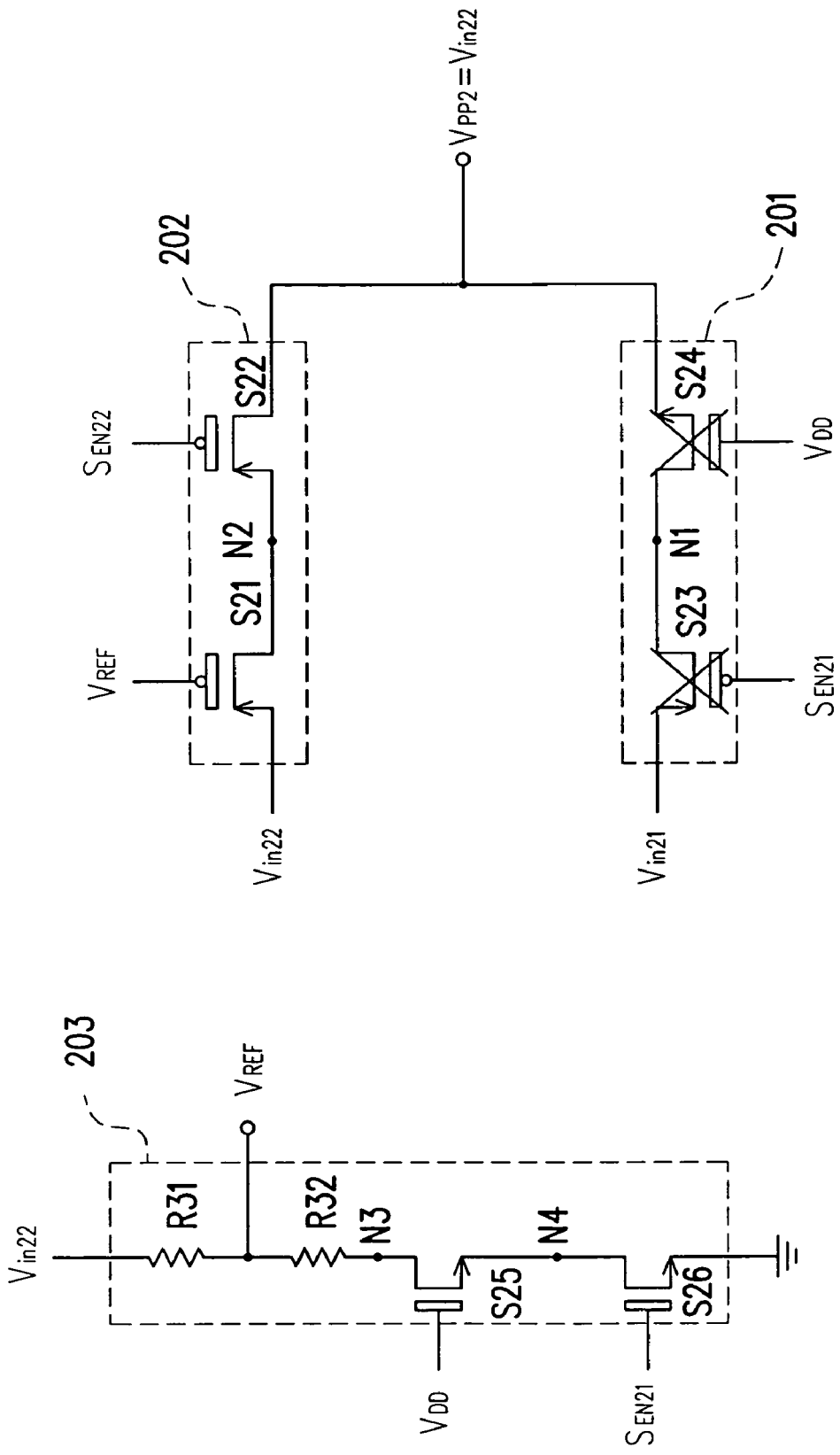

On the contrary, when the enable signals SEN21 and SEN22 are logic high (5V) and logic low (0V), the conduction states of the switches S21~S26 is shown in FIG. 6. From the showing of the node voltages VN3 and VN4, the gate-to-source voltages of the switches S25 and S26 are higher than the threshold voltage, so the switches S25 and S26 are both turned on. Because the switches S25 and S26 are both turned on, the input voltage Vin22 is dropped on the resistors R31 and R32. The reference voltage VREF is generated from a voltage division on the input voltage Vin22 by the resistors R31 and R32. In the embodiment, in order to make the switch S21 on when the output voltage Vpp2 is output from the second switch circuit 202, the resistance ratio of the resistors R31 and R32 is shown in equation (1), which means the source-to-gate voltage $V_{SG21}$ of the switch S21 is higher than the threshold voltage ($V_{TH}$) but lower than the operation voltage VDD (5V).

$$|V_{TH}| < V_{SG21} < VDD \qquad (1)$$

Therefore, because $V_{SG21}$ is higher than the threshold voltage and the enable signal SEN22 is logic low (0V), the switches S21 and S22 of the second switch circuit 202 are both turned on. In this case, the switches S23 and S24 are both turned off because the enable signal SEN21 is logic high (5V) and the gate voltage of the switch S24 is logic high (5V). So, the output voltage Vpp2 is generated from the second switch circuit 202, i.e. the output voltage Vpp2 is equal to Vin22 (7V). Under this case, the conduction states of the switches S21~S24 is also known from the node voltage VN1 and VN2 in FIG. 4.

The power switch device is produced by a manufacturing process suitable for the operation voltage VDD of 5V, for making the output voltage Vpp2 being switched as either one of 1.8V and 7V. By fine tuning the resistance values of the resistors R31 and R32 under the criteria of the equation (1), the allowable ranges of the operation voltage VDD and the output voltage Vpp2 are changed. The second switch circuit 202, especially, the switch S21, for receiving VREF (in the case of being 7V), may be manufactured by a 5V manufacturing process if the switch S21 still meets the equation (1). For example, if the power switch device is used for generating the output voltage Vpp2 switched as either one of 2.5V and 8V, by tuning resistance values of the resistors R31 and R32 within the criteria of the equation (1), the switch S21 of the second switch circuit 202, receiving a high voltage (8V) at its gate terminal, still can be manufactured by a 5V manufacturing process, rather than a 8V manufacturing process, because the resultant P-type MOSFET (the switch S21) can stand for 8V at its gate terminal and most importantly, its $V_{SG}$ is still lower than VDD (5V).

The embodiment of the invention may be appropriately applied as a power supply circuit for a memory, such as a flash memory. For example, when the flash memory is under programming mode, a high power supply (for example, 7V), used for programming the flash memory, is generated from the second switch circuit 202. When the flash memory is under normal mode, a low power supply (for example, 1.8V), used for powering the flash memory, is generated from the first switch circuit 201.

In this embodiment, the voltage division is carried out by the resistors R31 and R32 for generating the reference voltage VREF. Serially connected diodes or MOSFETs can be used to replace the resistors R31 and R32 for dividing the input voltage Vin22 into the reference voltage VREF.

In the invention, the power switch device is manufactured by low voltage manufacturing process. Therefore, the power switch device has small circuit layout and low power consumption.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A power switch device, receiving first and second input voltages and outputting an output voltage according to first and second enable signals, the power switch device comprising:
   a first switch circuit, receiving the first input voltage for outputting the output voltage under control of the first enable signal;
   a self-biasing circuit, receiving the second input voltage for outputting a reference voltage based on the first enable signal and an operation voltage; and
   a second switch circuit, coupled to the first switch circuit, receiving the second input voltage and outputting the output voltage based on the reference voltage and the second enable signal;
   wherein when the output voltage is generated from the first switch circuit, the output voltage is related to the first input voltage and when the output voltage is generated from the second switch circuit, the output voltage is related to the second input voltage.

2. The power switch device of claim 1, wherein when the output voltage is generated from the first switch circuit, the output voltage has a voltage value equal to the first input voltage.

3. The power switch device of claim 1, wherein when the output voltage is generated from the second switch circuit, the output voltage has a voltage value equal to the second input voltage.

4. The power switch device of claim 1, wherein the first input voltage is lower than the second input voltage.

5. The power switch device of claim 1, wherein the first and second enable signals are non-overlapping or reversed with each other.

6. The power switch device of claim 1, wherein the first switch circuit includes:
   a first switch, having a first terminal receiving the first input voltage and a second terminal, the conduction state between the first and second terminals of the first switch being under control of the first enable signal; and
   a second switch, having a first terminal coupled to the second terminal of the first switch and a second terminal for outputting the output voltage, the conduction state between the first and second terminals of the second switch being under control of the operation voltage.

7. The power switch device of claim 6, wherein the first switch is a P-type MOSFET and the second switch is an N-type MOSFET.

8. The power switch device of claim 1, wherein the second switch circuit includes:
   a third switch, having a first terminal receiving the second input voltage and a second terminal, the conduction state between the first and second terminals of the third switch being under control of the reference voltage; and
   a fourth switch, having a first terminal coupled to the second terminal of the third switch and a second terminal for outputting the output voltage, the conduction state between the first and second terminals of the fourth switch being under control of the second enable signal.

9. The power switch device of claim 8, wherein the third switch is a P-type MOSFET and the fourth switch is a P-type MOSFET.

10. The power switch device of claim 1, wherein the self-biasing circuit includes:
    a first resistor, having a first terminal coupled to the second input voltage and a second terminal for outputting the reference voltage;
    a second resistor, having a first terminal coupled to the second terminal of the first resistor and a second terminal;
    a fifth switch, having a first terminal coupled to the second terminal of the second resistor and a second terminal, the conduction state between the first and second terminals of the fifth switch being under control of the operation voltage; and
    a sixth switch, having a first terminal coupled to the second terminal of the fifth switch and a second terminal grounded, the conduction state between the first and second terminals of the sixth switch being under control of the first enable signal.

11. The power switch device of claim 10, wherein the fifth switch is an N-type MOSFET and the sixth switch is an N-type MOSFET.

12. A power switch device, receiving first and second input voltages and outputting an output voltage according to first and second enable signals, the power switch device comprising:
    a first switch, receiving the first input voltage, for passing the first input voltage according to the first enable signal;
    a second switch, coupled to the first switch, outputting the first input voltage passed from the first switch as the output voltage according to an operation voltage;
    a self-biasing circuit, receiving the second input voltage for outputting a reference voltage based on the first enable signal and the operation voltage;
    a third switch, receiving the second input voltage, for passing the second input voltage according to the reference voltage; and
    a fourth switch, coupled to the third switch, outputting the second input voltage passed from the third switch as the output voltage according to the second enable signal;
    wherein when the first enable signal is in a first logic state, the output voltage is related to the first input voltage and when the second enable signal is in a second logic state, the output voltage is related to the second input voltage.

13. The power switch device of claim 12, wherein the first, the third and the fourth switch includes a P-type MOSFET and the second switch includes an N-type MOSFET, respectively.

14. The power switch device of claim 12, wherein the self-biasing circuit includes:
- a first resistor, having a first terminal coupled to the second input voltage and a second terminal for outputting the reference voltage;
- a second resistor, having a first terminal coupled to the second terminal of the first resistor and a second terminal;
- a fifth switch, coupled to the second terminal of the second resistor, the conduction state of the fifth switch being under control of the operation voltage; and
- a sixth switch, coupled between the fifth switch and a ground terminal, the conduction state of the sixth switch being under control of the first enable signal.

15. The power switch device of claim 14, wherein the fifth switch is an N-type MOSFET and the sixth switch is an N-type MOSFET.

16. The power switch device of claim 12, wherein when the output voltage is generated from the second switch, the output voltage has a voltage value equal to the first input voltage.

17. The power switch device of claim 12, wherein when the output voltage is generated from the fourth switch, the output voltage has a voltage value equal to the second input voltage.

18. The power switch device of claim 12, wherein the first input voltage is lower than the second input voltage.

19. The power switch device of claim 12, wherein the first and the second enable signals are non-overlapping or reversed with each other.

* * * * *